United States Patent
Bolgar et al.

(10) Patent No.: US 9,625,101 B2
(45) Date of Patent: Apr. 18, 2017

(54) PRESSURE CONTROLLED CHAMBER

(71) Applicant: ROLLS-ROYCE PLC, London (GB)

(72) Inventors: Crispin D Bolgar, Nottingham (GB); Michael R Hancox, Shepreth (GB)

(73) Assignee: ROLLS-ROYCE plc, London (GB)

( * ) Notice: Subject to any disclaimer, the term of this patent is extended or adjusted under 35 U.S.C. 154(b) by 22 days.

(21) Appl. No.: 14/800,529

(22) Filed: Jul. 15, 2015

(65) Prior Publication Data
US 2016/0018058 A1 Jan. 21, 2016

(30) Foreign Application Priority Data
Jul. 21, 2014 (GB) .................................. 1412869.8

(51) Int. Cl.
*F17C 13/00* (2006.01)
*F01D 25/16* (2006.01)
(Continued)

(52) U.S. Cl.
CPC ............ *F17C 13/002* (2013.01); *F01D 25/16* (2013.01); *F01D 25/162* (2013.01); *F01D 25/18* (2013.01); *F01D 25/183* (2013.01); *F02C 7/06* (2013.01); *F16C 33/726* (2013.01); *F05D 2220/32* (2013.01); *F05D 2240/50* (2013.01); *F05D 2240/55* (2013.01); *F05D 2260/605* (2013.01); *F05D 2260/98* (2013.01);
(Continued)

(58) Field of Classification Search
CPC ...... F17C 13/002; F01D 25/16; F01D 25/163; F01D 25/18; F01D 25/183; F02C 7/06; F16C 33/726
See application file for complete search history.

(56) References Cited

U.S. PATENT DOCUMENTS

| 3,195,303 A | 7/1965 | Widell |
| 3,592,213 A | 7/1971 | Smith |

(Continued)

FOREIGN PATENT DOCUMENTS

| EP | 0 392 713 A1 | 10/1990 |
| GB | 1 254 612 A | 11/1971 |

(Continued)

OTHER PUBLICATIONS

Nov. 25, 2015 European Search Report issued in Great Britain Patent Application No. 15 17 6769.

(Continued)

*Primary Examiner* — Craig Schneider
*Assistant Examiner* — Kevin Barss
(74) *Attorney, Agent, or Firm* — Oliff PLC

(57) ABSTRACT

A pressure controlled chamber arrangement comprising a chamber, one or more seals arranged in use to limit fluid flow between the inside and outside of the chamber and a vent system arranged in use to remove a vent flow of fluid from the inside of the chamber. The vent system at least contributes to the formation of a pressure drop across the one or more seals from the outside to the inside of the chamber. The vent system comprises a flow controller arranged in use to control the quantity of fluid removal via the vent system in accordance with the sealing performance provided by the one or more seals, the vent system giving increased quantity of fluid removal for decreased sealing performance.

10 Claims, 3 Drawing Sheets

(51) Int. Cl.
  *F01D 25/18* (2006.01)
  *F16C 33/72* (2006.01)
  *F02C 7/06* (2006.01)

(52) U.S. Cl.
  CPC .. *F05D 2270/3015* (2013.01); *F05D 2270/42* (2013.01); *F16C 2360/23* (2013.01)

(56) References Cited

U.S. PATENT DOCUMENTS

| | | | |
|---|---|---|---|
| 3,631,684 A | 1/1972 | Randall | |
| 3,641,766 A | 2/1972 | Uehling | |
| 4,621,981 A | 11/1986 | Lorett | |
| 5,063,733 A | 11/1991 | Jackson et al. | |
| 5,322,373 A * | 6/1994 | Oakes | F16C 33/664 384/462 |
| 7,591,631 B2 * | 9/2009 | Hendricks | F01D 11/04 415/111 |
| 7,935,164 B2 * | 5/2011 | Fang | B01D 45/14 55/385.3 |
| 8,235,647 B2 * | 8/2012 | Pisseloup | F01D 25/16 184/6.11 |
| 2004/0031249 A1 * | 2/2004 | Broughton | B01D 45/16 55/385.3 |
| 2008/0047266 A1 | 2/2008 | Dumas et al. | |
| 2009/0155053 A1 | 6/2009 | Speak | |
| 2009/0288384 A1 | 11/2009 | Granitz et al. | |
| 2010/0212281 A1 | 8/2010 | Sheridan | |
| 2010/0294371 A1 | 11/2010 | Parnin et al. | |
| 2010/0294597 A1 | 11/2010 | Parnin | |
| 2012/0227414 A1 | 9/2012 | Lewis et al. | |
| 2012/0315137 A1 * | 12/2012 | Alvarez | F01D 25/18 415/229 |
| 2013/0078091 A1 * | 3/2013 | Rees | F01D 11/025 415/230 |
| 2013/0177406 A1 * | 7/2013 | Heaton | F01D 25/162 415/176 |
| 2014/0096533 A1 * | 4/2014 | Homeyer | F01D 25/183 60/778 |
| 2014/0286599 A1 * | 9/2014 | Devitt | F16C 32/0618 384/101 |
| 2016/0010671 A1 * | 1/2016 | Shellef | F04D 29/106 137/14 |

FOREIGN PATENT DOCUMENTS

| | | |
|---|---|---|
| GB | 2 119 858 A | 11/1983 |
| GB | 2391959 A | 2/2004 |
| GB | 2 437 969 A | 11/2007 |
| JP | S4928503 U1 | 3/1974 |

OTHER PUBLICATIONS

Mar. 19, 2015 Search Report issued in Application No. GB1412869.8.

* cited by examiner

PRESSURE CONTROLLED CHAMBER

The present disclosure concerns pressure controlled chamber arrangements, methods of controlling fluid removal from pressure controlled chamber arrangements and gas turbine engines. The invention may have particular utility in controlling vent flow from the bearing chambers of gas turbine engines. For simplicity the background section introduces the disclosure in the context of bearing chamber vent flow control. Despite this the invention is not limited to such uses and could for example be used in the context of clean rooms or hazardous material storage.

Gas turbine engines comprise one or more rotating shafts, for which support from one or more bearings is required. These bearings are lubricated by oil, which is pumped into and out of bearing chambers in a closed circuit, the bearing chambers surrounding the bearings. In order to limit the risk of oil fires and cabin fume issues, it is desirable to prevent leakage of oil from the circuit. A potential source of oil escape is the rotating to static interface between the shaft and bearing chamber.

Typically, seals are used to limit oil escape, but as seals are not completely leak-proof it is normal to ensure that the pressure outside the bearing chamber is higher than the pressure within the bearing chamber. In this way air leaks into the chamber through the seals, preventing oil escape.

The pressure differential is created by a vent system. The vent system draws air from inside the bearing chamber via a vent line, thereby creating a pressure differential that tends to cause fluid leakage across the seals from the outside to the inside of the bearing chamber. The vent air drawn from the bearing chamber is exhausted overboard via various air/oil separation devices. A vent restrictor is typically used to control the amount of airflow drawn through the vent line, the vent restrictor typically being a fixed capacity orifice plate or venturi that is sized to give the maximum airflow that might be required regardless of engine operating point.

Where the sealing performance is sufficiently high, i.e. where the leakage capacity through the seals is significantly less than the capacity of the vent line, the bearing chamber pressure will reach that of the vent line. In this case the pressure differential created across the seals may cause them to fail. This may lead to inefficient quantities of sealing air consumption and/or oil leakage.

In order to address the above mentioned problem, consideration has been given to use of a very low capacity vent system or elimination of the vent system altogether. If the sealing performance were of sufficient quality, part of the need for the vent system would indeed be eliminated. Nonetheless the need for a vent system would remain as a precaution against the risk of seal failure and consequent oil leakage. Further, the capacity of an oil scavenge line for the bearing chamber driven by a scavenge pump exceeds the oil feed capacity so as oil flooding is avoided. Thus it is possible that even without a vent system, the pressure in the bearing chamber would be reduced by the oil scavenge line to a level sufficient to damage the seals.

According to a first aspect of the invention there is provided a pressure controlled chamber arrangement optionally comprising a chamber, optionally one or more seals optionally arranged in use to limit fluid flow between the inside and outside of the chamber and optionally a vent system arranged in use to remove a vent flow of fluid from the inside of the chamber and optionally at least contribute to the formation of a pressure drop across the one or more seals from the outside to the inside of the chamber, the vent system optionally comprising a flow controller optionally arranged in use to control the quantity of fluid removal via the vent system optionally in accordance with the sealing performance provided by the one or more seals, the vent system optionally giving increased quantity of fluid removal for decreased sealing performance.

A change in sealing performance might for example be indicated by a change in the pressure differential between the inside and outside of the chamber; all else being equal, a drop in pressure differential indicating a deterioration in sealing performance.

Controlling the quantity of fluid removal in accordance with the sealing performance provided by the one or more seals may increase seal life and/or reduce the likelihood of seal failure. Protecting the seals in this way may in turn reduce the likelihood of leakage across the seals from the inside to the outside of the chamber. In the event of a seal failure the normal operation of the flow controller (i.e. increasing fluid removal in the event of sealing performance reduction) may be an appropriate response. Further the selecting of the quantity of fluid removal in accordance with sealing performance may increase efficiency, the fluid quantity removed from the chamber being substantially the minimum required in order to produce the necessary degree of sealing.

In some embodiments the flow controller biases the apparatus towards an equilibrium condition where the pressure ratio across the seals is substantially consistent regardless of the sealing performance. Thus while the pressure ratio across the seals may vary where there is a change in the sealing performance, the flow controller returns the apparatus to an equilibrium condition by recovering the pressure ratio across the seals.

In some embodiments the flow controller uses a control fluid flow to control the quantity of fluid removal via the vent system. The control fluid flow may be delivered via a control line in fluid communication with a source of pressurised fluid.

In some embodiments the flow controller is arranged such that an increase in vent flow pressure relative to control fluid flow pressure results in an increase in the quantity of fluid removal.

In some embodiments the control fluid flow is taken from a source giving a control fluid flow pressure with a known relationship to the pressure around the seals external to the chamber. If the control fluid flow pressure is related to the pressure around the seals external to the chamber, it may be that the control fluid flow can be managed more easily to give passive control over the pressure differential across the seals. The pressure around the seals external to the chamber is a factor in determining the pressure differential across the seals.

Because the control fluid flow pressure is related to the pressure on one side of the seals, it may therefore be more useful for use in directly controlling the quantity of fluid removed from the chamber to control the pressure differential. It may be that upon a change in the pressure differential across the seals, the flow controller uses the control fluid flow to automatically give rise to a predictable alteration in the quantity of fluid removed from the chamber. Passive control may be desirable, as it may allow for a reduction in component count and improve reliability.

In some embodiments the control fluid flow is taken from a source giving a control fluid flow pressure proportional to the pressure around the seals external to the chamber. If the control fluid flow pressure is proportional to the pressure around the seals external to the chamber, the quantity of management required in order for the control fluid flow to facilitate passive control over the quantity of fluid removed may be reduced. Specifically an increase in sealing performance would give rise to a relative drop in the pressure of the vent flow with respect to the control fluid flow pressure. Similarly a decrease in sealing performance would give rise to a relative increase in the pressure of the vent flow with respect to the control fluid flow pressure. Where, as may be convenient, the control fluid flow is used to inhibit vent flow, the relationship described above may naturally and desirably give a reduced quantity of vent flow when the sealing performance is higher and vice versa. This in turn may give an apparatus that tends towards an equilibrium condition where the pressure ratio across the seals is substantially consistent regardless of the sealing performance.

In some embodiments the control fluid flow is taken from a source giving a control fluid flow pressure that is the same as the pressure around the seals external to the chamber. This may further reduce the management required in order for the control fluid flow to facilitate passive control over the quantity of fluid removed.

In some embodiments the control fluid flow is taken from a cavity surrounding the chamber. In the context of gas turbine engine bearing chambers such cavities are usually known as buffers and are supplied with pressurised air bleed from the engine core. Taking the control fluid flow from a cavity surrounding the chamber may mean that it is unnecessary to provide an alternate source of pressurised fluid for the control fluid flow. This may minimise the component count and give a compact apparatus with the control fluid flow and vent flow pressures nonetheless reflecting the pressure difference across the seals.

In some embodiments the control fluid flow is taken from a source giving a pressure that is greater than the pressure around the seals external to the chamber. This may enable use of a smaller vortex chamber.

In some embodiments the flow controller is a vortex device. The flow controller may for example be a vortex amplifier. The control fluid flow may be delivered to the vortex device via the control line while the vent flow may be delivered to the vortex device via a portion of a vent line between the interior of the chamber and the vortex device. The control fluid flow and vent flow may be combined in the vortex device with the control fluid flow tending to generate a vortex that inhibits passage of the vent flow through the vortex device. As will be appreciated, if the sealing performance worsens, the pressure in the chamber will increase as fluid leaks more rapidly across the seals from the outside to the inside of the chamber. The pressure of the vent flow will consequently increase. The increased pressure of the vent flow relative to the control fluid flow will tend to cause a disruption to the vortex created by the control fluid flow. The quantity of fluid removed from the chamber via the vent flow is therefore increased, compensating for the sealing performance deterioration. As will be appreciated an improvement in the sealing performance would cause the opposite effect. Consequently the vortex amplifier may be used to maintain a substantially consistent pressure differential across the seals regardless of the sealing performance.

In some embodiments the control fluid flow and vent flow are combined in a vortex chamber of the vortex device, with the control fluid flow being directed into the vortex chamber in a manner so as it is encouraged to generate a vortex that inhibits passage of the vent flow through the vortex chamber from a vent flow inlet to a vent flow outlet. The control fluid flow may for example enter the chamber in a direction substantially parallel to a curved wall of the chamber at its point of entry.

In some embodiments the vortex chamber is arranged so that changes in the pressure differential between the control fluid flow and vent flow cause a change in the strength of the vortex and a consequent change in the quantity of fluid removed via the vent system.

In some embodiments the vent system comprises multiple flow controllers. It may be that one, some or all of the controllers giving different quantities of fluid removal to one another for at least some combinations of a given vent flow pressure and control fluid flow pressure. The different flow control characteristics of each flow controller could for instance arise as a result of different sizes and/or shapes of vortex chambers. This may be desirable where a particular vent characteristic is desired but would be difficult to achieve with a single flow controller given other apparatus constraints.

In some embodiments some or all of the flow controllers may be provided in parallel.

In some embodiments one, some or all of the flow controllers are fed by separate control lines and/or vent lines. Alternatively or additional (except where mutually exclusive) one, some or all some or all of the flow controllers may be ganged with respect to control line and/or vent line provision.

In some embodiments some or all of the flow controllers may be connected in series.

In some embodiments the chamber is a bearing chamber. The bearing chamber may be part of a gas turbine engine. The seals may be located at a rotating to static interface between the bearing chamber and a shaft of the gas turbine engine.

According to a second aspect of the invention there is provided a gas turbine engine having a pressure controlled chamber arrangement in accordance with the first aspect.

According to a third aspect of the invention there is provided a method of controlling fluid removal from a pressure controlled chamber arrangement comprising increasing the quantity of fluid removal where sealing performance for limiting fluid flow between the inside and outside of a chamber of the arrangement is diminished.

The skilled person will appreciate that a feature described in relation to any one of the above aspects of the invention may, except where mutually exclusive, be applied mutatis mutandis to any other aspect of the invention.

Embodiments of the invention will now be described by way of example only, with reference to the Figures, in which.

Figure 3A:
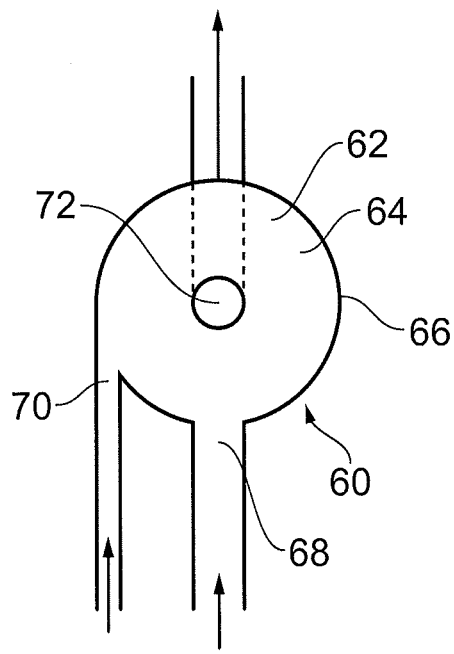
Figure 3B:
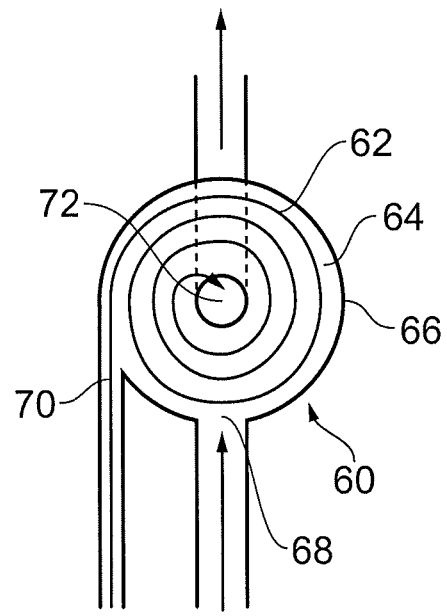
Figure 3C:
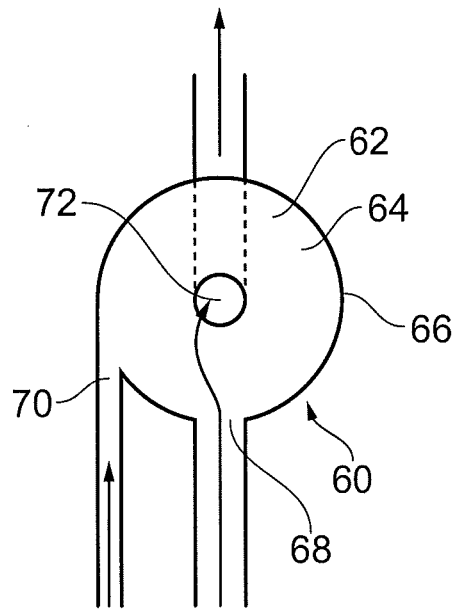
Figure 4:
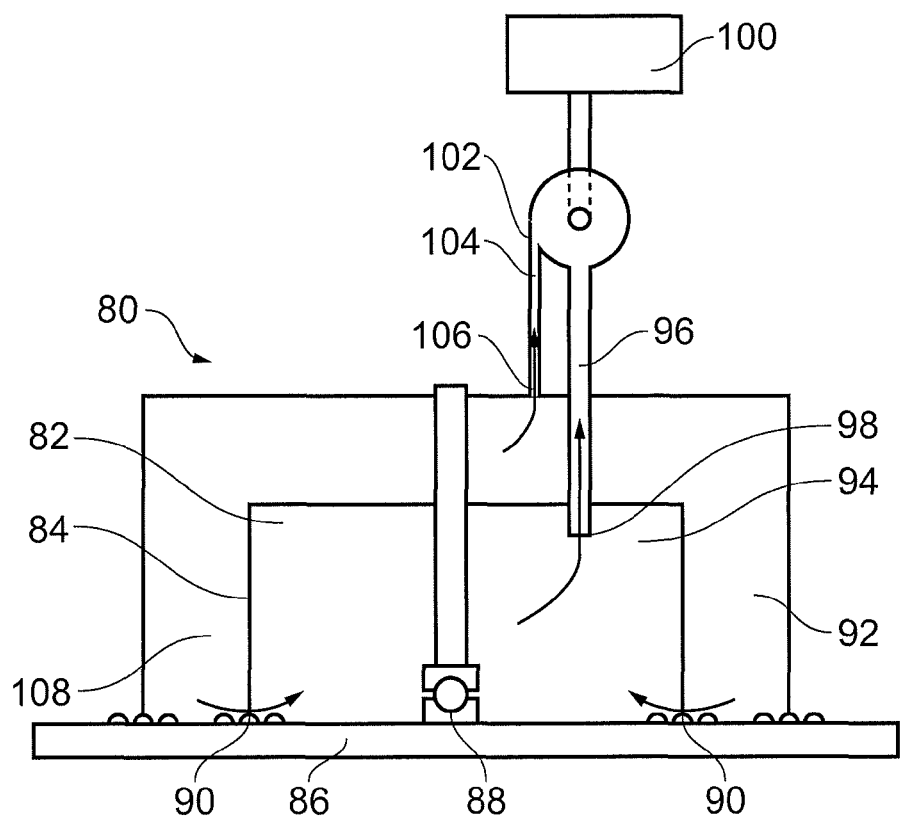
Figure 5:
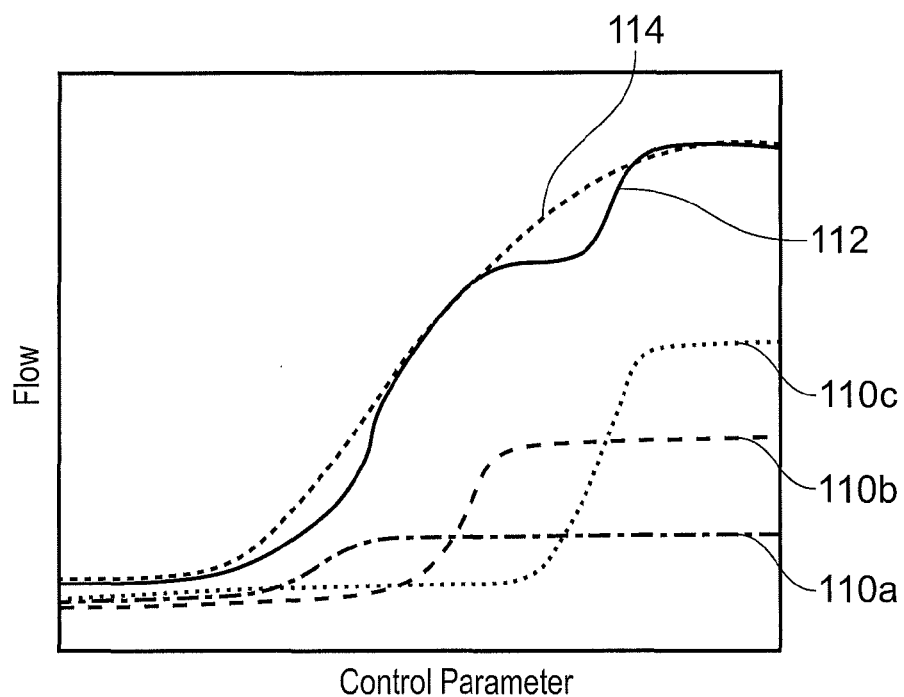

FIG. 3*a* is plan view of a vortex amplifier for use in embodiments of the invention;

FIG. 3*b* shows the vortex amplifier of FIG. 3*a* in a high resistance state;

FIG. 3*c* shows the vortex amplifier of FIG. 3*a* in a low resistance state;

FIG. 4 is a schematic representation of a controlled chamber arrangement in accordance with an embodiment of the present invention;

FIG. 5 shows the contributions of three flow controllers in producing a characteristic plot of vent flow quantity against sealing performance.

Figure 1:
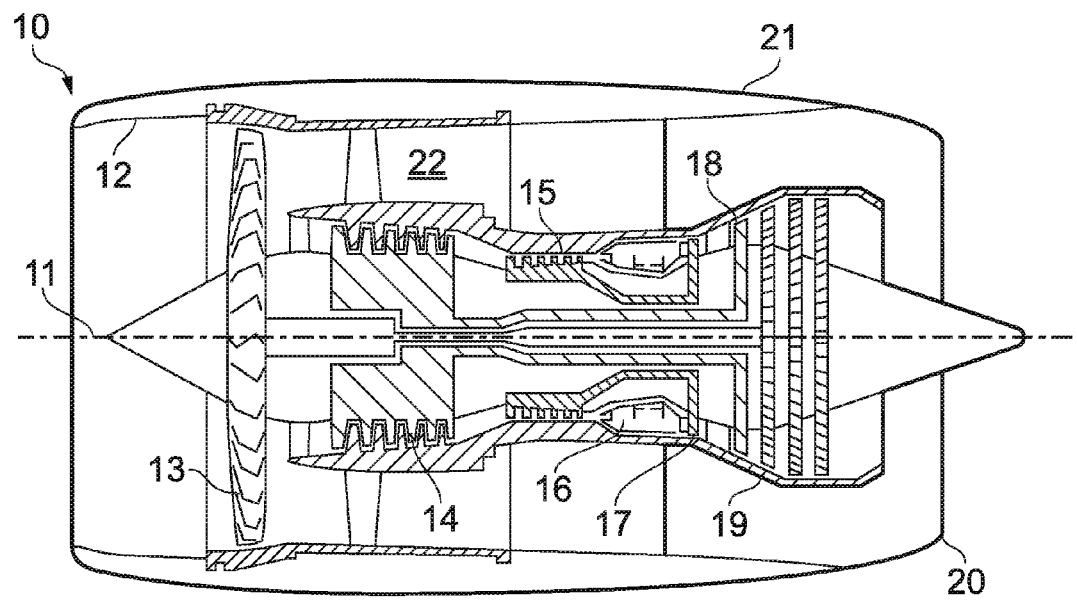
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Figure 2:
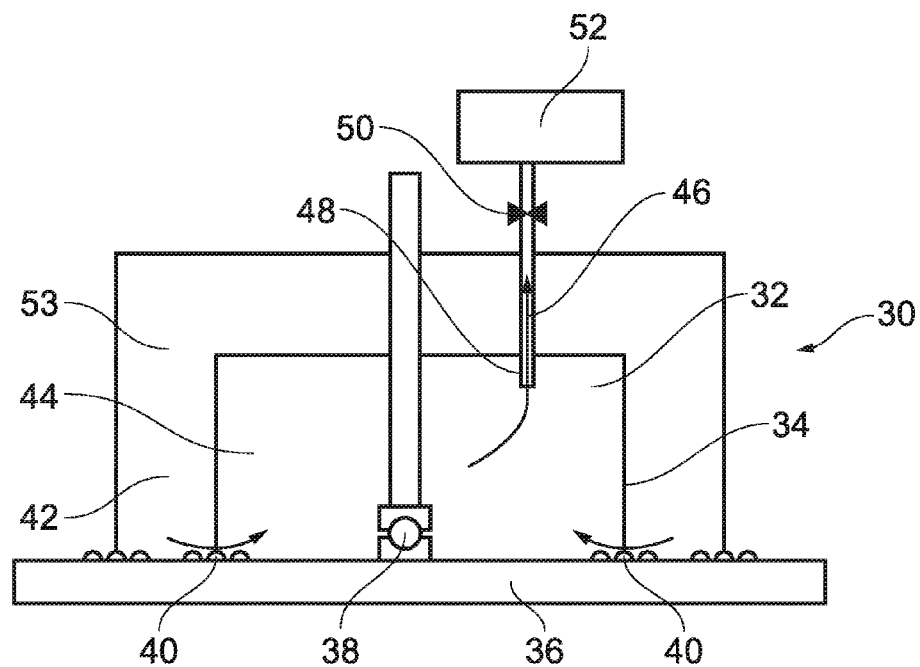
FIG. 2 is a schematic representation of a prior art pressure controlled chamber arrangement.

Each of the interconnecting shafts is supported by a number of bearing arrangements. In prior art systems each bearing arrangement has been contained within a pressure controlled chamber arrangement 30 such as that shown in FIG. 2. The chamber arrangement 30 comprises a bearing chamber 32 having a chamber wall 34. A gas turbine engine shaft 36 passes through the centre of the chamber 32, rotationally supported by a bearing arrangement 38. Seals 40 are provided at the rotating to static interface between the chamber wall 34 and shaft 36. The seals 40 provide a fluid leakage path between the outside 42 and inside 44 of the bearing chamber 32.

The bearing arrangement 38 needs lubrication and cooling. Oil is delivered to the inside 44 of the bearing chamber 32 via an oil line (not shown) to lubricate and cool the bearing arrangement 38. The used oil is pumped out of the bearing chamber 32 via a scavenge line (not shown), is processed to remove air and cool the oil and is returned to an oil tank (not shown).

The pressure controlled chamber arrangement 30 also comprises a vent line 46 which has an inlet 48 in fluid communication with the inside 44 of the bearing chamber 32. A flow restrictor 50 (fixed geometry orifice plate) and air/oil separation device 52 are provided in the vent line 46. The vent line 46 passes through the chamber wall 34 and terminates with an exhaust to atmosphere (not shown).

In use it is desired that there be a constant flow of fluid from the outside 42 to the inside 44 of the bearing chamber 32 via the leakage paths in order to prevent the leakage of oil from the bearing chamber 32. To this end the area surrounding the bearing chamber 32 (a buffer 53) is maintained at an elevated pressure using compressor bleed air. Additionally fluid is removed from the bearing chamber 32 via the vent line 46. Where the seals 40 are giving the desired sealing performance, the vent flow leaving the inside 44 of the bearing chamber 32 and elevated pressure outside 42 of the bearing chamber 32 generally gives a moderate pressure differential across the seals 40 sufficient to cause a desired level of fluid leakage through the fluid leakage paths. The flow restrictor 50 controls the quantity of fluid removed from the bearing chamber 32 via the vent line 46.

Referring now to FIG. 3*a* a vortex device, in this case a vortex amplifier is generally shown at 60. The vortex amplifier 60 has a vortex chamber 62. The vortex chamber 62 is of substantially disc like shape, having parallel and opposed top 64 and bottom (not shown) walls and a curved side wall 66 spanning the gap between the top 64 and bottom walls and joining them at their perimeters.

The vortex chamber 62 is fluid tight with the exception of a vent inlet 68 for introducing a vent flow, a control inlet 70 for introducing a control fluid flow and a vent outlet 72 for draining the control and vent flows. The vent inlet 68 is provided in and from a direction perpendicular to the side wall 66. The control inlet 70 is provided in and from a direction tangential to its point of entry at the side wall 66. The vent outlet 72 is provided in and towards a direction perpendicular to the centre of the bottom wall.

In use the vortex chamber 62 is capable of providing different degrees of resistance to the flow of fluid from the vent inlet 68 to the vent outlet 72 through variation of the fluid pressure introduced via the control inlet 70. The vortex chamber 62 can therefore be used to control the quantity of fluid that passes through the vortex amplifier 60 from the vent inlet 68 to the vent outlet 72.

With reference to FIG. 3*b*, the vortex amplifier 60 is shown in a high resistance state. In this state the pressure of the control fluid flow is relatively high and/or the pressure of the vent flow is relatively low. The control fluid flow is encouraged to form a vortex, being introduced parallel to and subsequently turned by the side wall 66. In the high resistance state the relative fluid pressures of the vent and control fluid flows mean that the control fluid flow can form a relatively strong and stable vortex. The vortex prevents efficient, relatively direct flow of the vent flow from the vent inlet 68 to the vent outlet 72, limiting the quantity of vent flow passing through the vortex amplifier 60.

With reference to FIG. 3*c*, the vortex amplifier 60 is shown in a low resistance state. In this state the pressure of the control fluid flow is relatively low and/or the pressure of the vent flow is relatively high. In the low resistance state the relative fluid pressures of the vent and control fluid flows mean that the control fluid flow cannot form a relatively strong and stable vortex. The vortex is weakened by the vent flow which is consequently able to pass more efficiently and directly from the vent inlet 68 to the vent outlet 72. The quantity of vent flow passing through the vortex amplifier 60 is therefore increased by comparison with the high resistance state of FIG. 3*b*.

Referring now to FIG. 4 a pressure controlled chamber arrangement is generally shown at 80. The chamber arrangement 80 comprises a chamber, in this case a bearing chamber 82, having a chamber wall 84. A gas turbine engine shaft 86 passes through the centre of the chamber 82, rotationally supported by a bearing arrangement 88. Seals 90 are provided at the rotating to static interface between the chamber wall 84 and shaft 86. The seals 90 provide a fluid leakage path between the outside 92 and inside 94 of the bearing chamber 82.

The bearing arrangement 88 needs lubrication and cooling. Oil is delivered to the inside 94 bearing chamber 82 via an oil line (not shown) to lubricate and cool the bearing arrangement 88. The used oil is pumped out of the bearing chamber 82 via a scavenge line (not shown), is processed to remove air and cool the oil and is returned to an oil tank (not shown).

The pressure controlled chamber arrangement 80 also comprises a vent line 96 which has an inlet 98 in fluid communication with the inside 94 of the bearing chamber 82. A flow controller, in this case the vortex amplifier 60, and an air/oil separation device 100 are provided in the vent line 96. The vent line 96 passes through the chamber wall 84 and terminates with an exhaust to atmosphere (not shown).

The vortex amplifier 60 is connected to the vent line 96 by the vent inlet 68 on the inlet side and the vent outlet 72 on the outlet side. The control inlet 70 of the vortex amplifier 60 is connected to a downstream end 102 of a control line 104. An upstream end 106 of the control line 102 is in fluid communication with a source of control fluid, specifically pressurised bleed fluid surrounding the seals 90 in a cavity 108 (known as a buffer) surrounding the chamber 82.

In use it is desired that there be a constant flow of fluid from the outside 92 to the inside 94 of the bearing chamber 82 via the leakage paths in order to prevent the leakage of oil from the bearing chamber 82. To this end the area surrounding the bearing chamber 82 is maintained at an elevated pressure using compressor bleed air. Additionally fluid is removed from the bearing chamber 82 via the vent line 96. The vent flow leaving the inside 94 of the bearing chamber 82 and elevated pressure outside 92 of the bearing chamber 82 generally gives a moderate pressure differential across the seals 90 sufficient to cause a desired level of fluid leakage through the fluid leakage paths.

The quantity of fluid removed from the inside 94 of the bearing chamber 82 in the vent flow, is controlled by the vortex amplifier 60 in accordance with the sealing performance provided by the seals 90.

Where, as may occur from time to time, there is a decrease in the sealing performance provided by the seals 90, the pressure differential between the inside 94 and outside 92 of the bearing chamber 82 will decrease. Because the control fluid flow to the vortex amplifier 60 comes from fluid in the cavity 108 surrounding the bearing chamber 82 (and specifically the fluid surrounding the outside of the seals 90), the pressure differential decrease will cause a weakening of the vortex and an increase in the quantity of fluid removed from the inside 94 of the chamber 82. As will be appreciated an increase in the sealing performance would have the opposite effect. The vortex amplifier 60 therefore compensates for a change in sealing performance by increasing or decreasing the quantity of fluid removed from the inside 94 of the bearing chamber 82 accordingly. Further, in this embodiment, the quantity of fluid removed from the inside 94 of the bearing chamber 82 is tuned by the vortex amplifier 60 maintain an equilibrium condition where the pressure ratio across the seals 90 is substantially consistent regardless of the sealing performance. This protects the seals 90, reduces the likelihood of oil leakage from the bearing chamber 82 and increases efficiency.

As will be appreciated the control exerted by the vortex amplifier 60 is passive in the sense that the vortex amplifier 60 is not actively controlled (e.g. via signals from an engine electronic control (EEC)). The passive control exerted by the vortex amplifier 60 is in part possible because the control fluid flow source gives a pressure with a known relationship to the pressure around the seals 90 external to the bearing chamber 82. Indeed the control is simplified because the source further gives a control fluid flow pressure proportional to and in fact the same as the pressure around the seals 90 external to the bearing chamber 82.

As will be appreciated, in some embodiments of the invention it may not be possible to tune a single flow controller such as the vortex amplifier 60 to maintain an equilibrium condition where the pressure ratio across the seals 90 is substantially consistent regardless of the sealing performance (or indeed to achieve an alternative desired characteristic). With reference now to FIG. 5, the use of multiple flow controllers may however facilitate such tuning to give a particular vent flow quantity v sealing performance characteristic. FIG. 5 shows the different vent flow quantity performance (vertical axis) for three distinct vortex amplifiers 110a, 110b and 110c against sealing performance (horizontal axis). When run in parallel the three vortex amplifiers 110a, 110b, 110c give rise to the characteristic 112 which approximates a desired characteristic 114.

It will be understood that the invention is not limited to the embodiments above-described and various modifications and improvements can be made without departing from the various concepts described herein. Except where mutually exclusive, any of the features may be employed separately or in combination with any other features and the invention extends to and includes all combinations and sub-combinations of one or more features described herein in any form of pressure controlled chamber arrangement.

The invention claimed is:

1. A pressure controlled chamber arrangement comprising:
   a chamber;
   one or more seals arranged in use to limit fluid flow between the inside and outside of the chamber; and
   a vent system arranged in use to remove a vent flow of fluid from the inside of the chamber and at least contribute to the formation of a pressure drop across the one or more seals from the outside to the inside of the chamber, the vent system comprising a flow controller arranged in use to control the quantity of fluid removal via the vent system in accordance with the sealing performance provided by the one or more seals, the vent system giving increased quantity of fluid removal for decreased sealing performance,
   wherein:
   the flow controller controls the quantity of fluid removal using a control fluid flow taken from a source giving a control fluid flow pressure proportional to the pressure around the seals external to the chamber, and
   the flow controller is a vortex device in which the control fluid flow and the vent flow are combined such that the control fluid flow generates a vortex that inhibits passage of the vent flow through the vortex device.

2. A pressure controlled chamber arrangement according to claim 1, wherein the flow controller biases the arrangement towards an equilibrium condition where the pressure ratio across the seals is substantially consistent regardless of the sealing performance.

3. A pressure controlled chamber arrangement according to claim 1, wherein the control fluid flow is taken from a source giving a control fluid flow pressure that is the same as the pressure around the seals external to the chamber.

4. A pressure controlled chamber arrangement according to claim 1, wherein the control fluid flow is taken from a cavity surrounding the chamber.

5. A pressure controlled chamber arrangement according to claim 1, wherein the control fluid flow is taken from a source giving a control fluid flow pressure that is greater than the pressure around the seals external to the chamber.

6. A pressure controlled chamber arrangement according to claim 1, wherein:
   the control fluid flow and the vent flow are combined in a vortex chamber of the vortex device, and
   the vortex chamber is arranged so that changes in the pressure differential between the control fluid flow and the vent flow cause a change in the strength of the vortex and a consequent change in the quantity of fluid removed via the vent system.

7. A pressure controlled chamber arrangement according to claim 1, wherein:
the vent system comprises multiple flow controllers, and one, some or all of the controllers give different quantities of fluid removal to one another for at least some combinations of a given vent flow pressure and control fluid flow pressure.

8. A pressure controlled chamber arrangement according to claim 1, wherein the chamber is a bearing chamber.

9. A gas turbine engine having a pressure controlled chamber arrangement in accordance with claim 1.

10. A pressure controlled chamber arrangement according to claim 1, wherein:
the control fluid flow is delivered to the vortex device via a control line, and
the vent flow is delivered to the vortex device via a vent line that is separate from the control line.

\* \* \* \* \*